United States Patent
Geber et al.

(10) Patent No.: US 6,914,347 B2
(45) Date of Patent: Jul. 5, 2005

(54) ELECTRONIC STARTER AND STEERING LOCK DEVICE FOR A MOTOR VEHICLE

(75) Inventors: Michael Geber, Bad Urach (DE); Andreas Pohlmann, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/344,282

(22) PCT Filed: Aug. 7, 2001

(86) PCT No.: PCT/EP01/09115
§ 371 (c)(1), (2), (4) Date: Dec. 30, 2003

(87) PCT Pub. No.: WO02/12032
PCT Pub. Date: Feb. 14, 2002

(65) Prior Publication Data
US 2004/0090124 A1 May 13, 2004

(30) Foreign Application Priority Data
Aug. 10, 2000 (DE) .......................... 100 39 090

(51) Int. Cl.[7] .............................................. H01H 27/00
(52) U.S. Cl. ...................... 307/10.3; 307/9.1; 307/10.6
(58) Field of Search ................................ 307/9.1, 10.3, 307/10.6

(56) References Cited

U.S. PATENT DOCUMENTS 6,380,642 B1 * 4/2002 Buchner .................... 307/10.3
6,548,915 B1 * 4/2003 Geber et al. ............... 307/10.2

FOREIGN PATENT DOCUMENTS

| DE | 44 34 587 A1 | 9/1994 |
| DE | 44 46 613 A1 | 12/1994 |
| DE | 196 34 627 C1 | 9/1996 |
| DE | 199 16 966 C2 | 4/1999 |
| EP | 0 733 521 A | 9/1996 |
| EP | 0 733 522 A | 9/1996 |
| EP | 0 733 524 A | 9/1996 |
| EP | 1 044 857 A | 10/2000 |
| FR | 2 767 767 A | 3/1999 |

* cited by examiner

Primary Examiner—Robert L. Deberadinis
(74) Attorney, Agent, or Firm—Crowell & Moring LLP

(57) ABSTRACT

An electronic starter and steering locking device for a motor vehicle has a steering locking unit including a locking control unit that operates an actuating unit for locking and unlocking a vehicle steering element; a vehicle starter unit for starting and shutting off the motor vehicle; and a voltage supply. The locking control unit is permanently connected to the voltage supply independently of the driving state of the vehicle, while the locking actuating unit is connected to the voltage supply via interrupter switching means which can be switched over as a function of the operating state of the vehicle starter unit and/or of the switched position of a drive train transmission shift lever.

4 Claims, 1 Drawing Sheet

ELECTRONIC STARTER AND STEERING LOCK DEVICE FOR A MOTOR VEHICLE

BACKGROUND AND SUMMARY OF THE INVENTION

This application claims the priority of German patent application 100 39 090.0, filed 10 Aug. 2000 (PCT International Application PCT/EP01/09115, filed 7 Aug. 2001), the disclosure of which is expressly incorporated by reference herein.

The invention relates to an electronic starter and steering locking device for a motor vehicle.

Particularly in automobiles, it is customary to provide a steering locking unit that performs an immobilizer function by holding the steering lock (or an equivalent vehicle steering element) locked against activation until the user of the vehicle has confirmed his authorization to drive the vehicle by means of a corresponding authorization arrangement (for example a mechanical or electronic key). The steering locking unit is coupled to the vehicle starter unit in such a way that it is ensured that it remains in its unlocked state when the engine starts.

In a device of this type, the vehicle starter unit comprises a mechanical ignition key/ignition lock system in which the ignition lock can customarily be rotated between (for example four) different positions by means of a key which provides authorization to drive. The steering locking unit comprises a locking control unit and an actuating unit which is actuated by it, with the steering locking unit being fed via a voltage supply line. When voltage is not applied to it, the steering locking unit is in the unlocked state from which it can be switched into its locked state by applying a voltage. The supply line is routed via the rotatable ignition lock, which thus functions as a looped-in mechanical break contact, i.e., interrupter switching element. The switching element keeps the supply line closed as long as the ignition lock has not yet been turned out of its home position (in which the key can be inserted and removed) by an angle which exceeds a predefinable threshold value; and the steering locking unit is correspondingly in its locked state. If the ignition lock is turned beyond the angular threshold value it interrupts the supply line, ensuring that the steering locking unit is in its unlocked state when the vehicle engine subsequently starts.

German Patent Document DE 196 34 627 C1 discloses an arrangement for coupling a steering wheel locking unit to an electronic immobilizer in which the steering wheel locking unit has a bolt as an actuating element. Movement of the bolt between an unlocked position and a locked position is blocked by means of a blocking device if the electronic immobilizer is primed. When the electronic immobilizer is disabled, the blocking device releases the bolt which can then be moved into its unlocked position, for example by the head of a vehicle key, by a separate transponder or a Bowden cable. Alternatively, the bolt can be activated by turning an ignition key which is plugged into an ignition lock as is known, for example, from German Patent Documents DE 44 34 587 A1 and DE 44 46 613 A1.

In modern automobiles, purely electronic ignition starter switch units without a mechanical ignition key/ignition lock system are increasingly being used as the vehicle starter unit. This includes in particular, systems without active key activation; i.e., what are referred to as keyless-go systems in which a locking system and an electronic immobilizer are controlled via wire-free communication by means of an authorization element, for example in the form of a chip card. For this purpose the latter needs merely be carried by the user, without the need for further action on his or her part.

German Patent Document DE 199 16 966.7 which is not prior art, discloses an electronic starter and steering locking device of the type mentioned above which is also suitable for such keyless-go systems. It includes status interrogation and starting blocking means which couple the steering locking unit to an ignition starter switch unit, interrogate the locked state of the steering locking unit and enable starting of the vehicle engine only if the interrogation reveals that the steering locking unit is in its unlocked state. In one advantageous embodiment, the steering locking unit has an actuating unit which actuates a locking control unit and an ignition starter control. The latter has a data communications link to the locking control unit, and is arranged in the ignition starter switch unit.

The voltage supply for both the locking control unit and the actuating unit is provided via a supply line that is connected to the vehicle's electrical supply independently of the operating state of the ignition starter switch unit, or is routed via the ignition starter switch unit in such a way that the steering locking unit is fed with either the full power of the vehicle's electrical system or a reduced power of the vehicle's electrical system. The steering locking unit can be switched over as a function of its operating state and in particular of the position of a mechanical ignition lock which is provided in it.

The reduced power is achieved by means of a current limiting function and is selected such that, although it is sufficient to operate the locking control unit, it is no longer sufficient to activate the actuating motor of the locking actuating unit. As a result, the locking control unit can be continuously interrogated by the ignition starter control unit with respect to the locked state, even in situations when the ignition is switched on.

In the driving mode, the steering locking unit should be prevented from inadvertently being placed in its locked state. One measure to ensure satisfaction of this safety measure in vehicles with automatic transmission is to conduct the voltage supply for the steering locking unit via a breaker contact which is assigned to the automatic transmission shift lever. Thus, the voltage supply is surely interrupted, even if the shift lever is not in the parked position "P".

European Patent Document EP 0 733 524 A1 discloses an electronic anti-theft device for a motor vehicle in which the starter is prevented from being supplied with electrical energy if the activation motor of a blocking device (anti-theft protection) of the anti-theft protection device has not reached an unlocking position. The activation motor of the blocking device is connected to a power source via a key switch when there is no key in an anti-theft switch. When the key is inserted into the key switch, the activation motor is connected to an unlocking contact which is assigned to a control switch. The unlocking contact only interacts simultaneously with the contact of the starter. The locking or unlocked state of the anti-theft protection is sensed by means of the status-determining switch.

One object of the invention is to provide an electronic starter and steering locking device of the type mentioned above which, on the one hand, reliably prevents the steering locking unit from being placed in the locked state in the driving mode, and on the other hand permits the state of the steering locking unit to be interrogated in order to start the vehicle independently of the position of a drive train transmission shift lever.

This and other objects and advantages are achieved by the electronic starter and steering locking device according to the invention, in which the voltage supply is characteristically provided in different ways for the locking control unit on the one hand and the locking actuating unit on the other. Specifically it is provided such that the locking control unit is permanently connected to the voltage supply, independently of the driving state of the vehicle (and thus in particular independently of the operating state of the vehicle starter unit and of the position of a drive train transmission shift lever), while the locking actuating unit is connected to the voltage supply via interrupter switching means. The latter can be switched over as a function of the operating state of the vehicle starter unit and/or of the switched position of the drive train transmission shift lever.

Separating the supply to the respective components of the steering locking unit in two in this way ensures, on the one hand, that the locking control unit is permanently operationally capable and that it is therefore always possible to communicate with it (for example, to interrogate the locked state of the steering locking unit). On the other hand, it is also ensured that, in specific driving operating states, the locking actuating unit cannot be inadvertently actuated and thus be placed in the locked state. As a result, it is, for example, advantageously ensured that, in a vehicle with automatic transmission, it remains possible to start the engine in the shift lever position "N", even if the voltage supply of the locking actuating unit is interrupted in this shift lever position. Starting of the engine is made dependent on a successful interrogation of the locked state of the steering locking unit by the vehicle starter unit.

Furthermore, the device contains as interrupter switching means a switching element which is assigned to the vehicle starter unit and whose switched position is thus dependent on the operating state of the vehicle starter unit. In series with the latter is a switching element whose switched state is dependent on the position of an automatic transmission shift lever. As a result, the supply voltage of the locking actuating unit is interrupted both in certain operating states of the vehicle starter unit and in certain operating states of the automatic transmission shift lever, so that the steering lock system is thus kept in the unlocked state.

In another embodiment of the invention, the vehicle starter unit contains a vehicle starter control unit which has a data communications link to the locking control unit. As the link is permanently activated (i.e., independently of the driving state), the communications link to the vehicle starter control unit is also maintained continuously.

Other objects, advantages and novel features of the present invention will become apparent from the following detailed description of the invention when considered in conjunction with the accompanying drawings.

BRIEF DESCRIPTION OF THE DRAWING

The single FIGURE shows a block diagram of an electronic starter and steering locking device for an automobile.

DETAILED DESCRIPTION OF THE DRAWING

Figure 1:
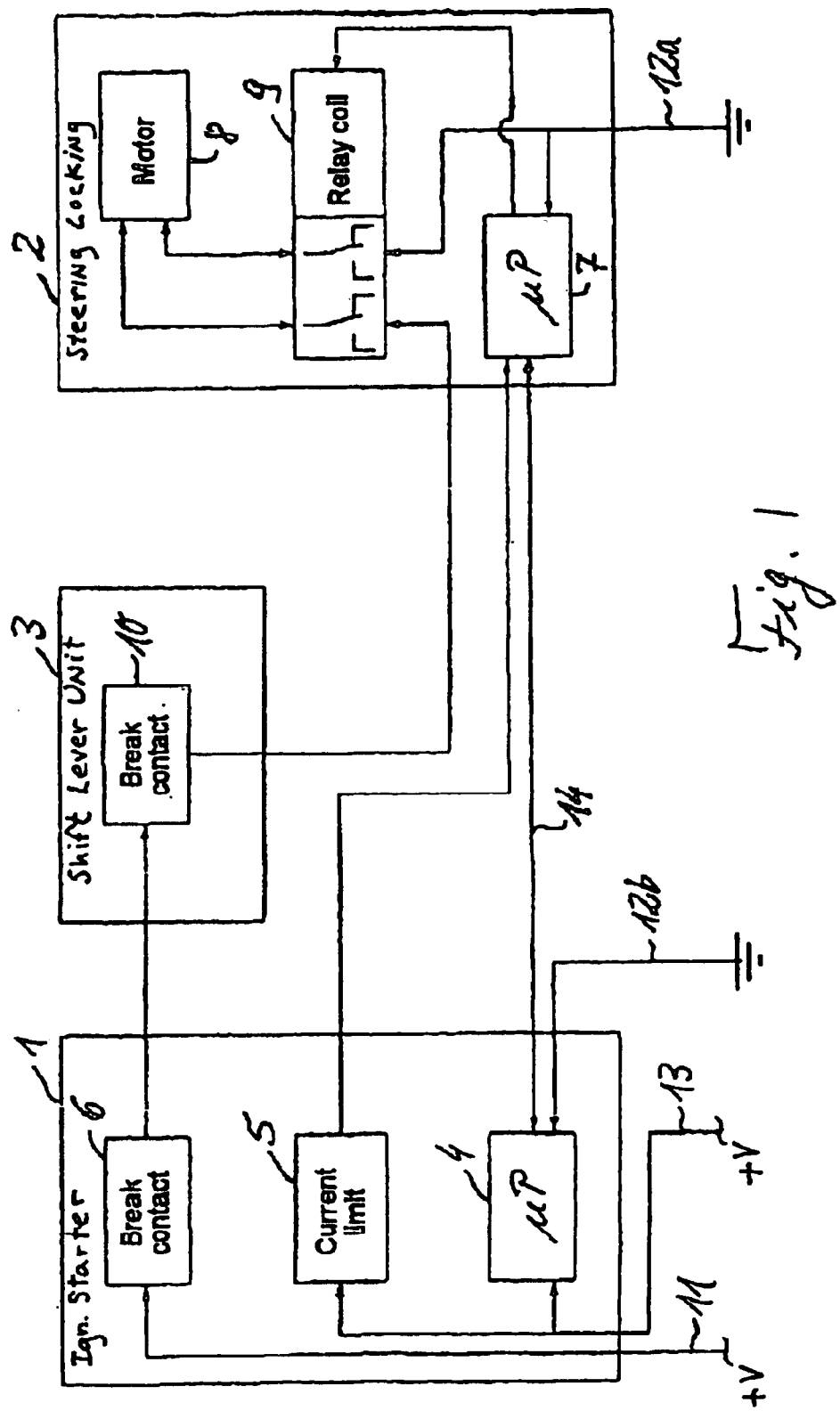

As shown in the FIGURE, the starter and steering locking device contains an ignition starter switch unit 1, a steering locking unit 2, for example in the form of a steering wheel locking unit, and an automatic transmission shift lever unit 3. The ignition starter switch unit 1 comprises an ignition starter control unit 4 with a microprocessor, a current limiting unit 5 and a break contact 6 (i.e., an interrupter switching element). The steering locking unit 2 comprises a locking control unit 7 with a microprocessor, a servomotor 8 with connected actuator element such as a steering wheel locking bolt (not shown), and a relay coil element 9 via which the servomotor 8 can be controlled by the locking control unit 7. (That is, a voltage can be applied to it, in a controllable fashion.)

The shift lever unit 3 contains a break contact 10 which is assigned to an automatic transmission shift lever (not shown) in such a way that it closes if the shift lever is in the parked position "P", and opens as soon as the shift lever is moved out of the parked position "P" into another shift lever position. Wherever precise details are not illustrated or described, the aforesaid system components have any desired conventional design.

Current is supplied to the above system components via a conventional electrical system of the vehicle with an appropriate battery as the voltage source. A plus line 11 of the battery (i.e., a standardized "terminal 30" line) is connected via the break contact 6 of the ignition starter switch unit 1 and the break contact 10 of the transmission shift lever 3 to a terminal of the relay coil 9. A second relay coil terminal is connected to a ground line 12a (i.e., a standardized "terminal 31" line), which is also connected to the locking control unit 7.

The ignition starter control unit 4 is connected on the one hand, to a ground line 12b and, on the other hand, to a standardized "terminal 30z" line 13 for supplying voltage. A branch of the "terminal 30z" line 13 also leads via the power limiter unit 5 to the locking control unit 7 so that the latter is fed with a suitably predefinable power limitation. The servomotor 8 of the steering locking unit 2 is connected to the relay coil 9 in such a way that battery voltage is applied to it by the locking control unit 7 via the positive line 11 of the battery, or it is enabled by said locking control unit 7 and can thus be activated or deactivated.

In this manner, a DC-isolated voltage supply is provided for the locking control unit 7 on the one hand and the actuating unit controlled by it, (in particular, the servomotor 8) on the other hand. The locking control unit 7 (that is, the actual processor and the associated electronics) is permanently supplied with voltage via the supply line 13 as is the ignition starter control unit 4. That is, such voltage supply is independent of the driving mode of the vehicle, particularly whether the vehicle drive engine is running, and in what position the transmission shift lever is located.

In contrast, the switching contacts of the relay coil 9 (and thus the servomotor 8) are supplied with voltage via the serially connected mechanical break contacts 6, 10 of the ignition starter switch unit 1 and the automatic transmission shift lever unit 3. This voltage supply of the locking actuating unit 8, 9 is consequently interrupted if the transmission shift lever is not in the parked position "P" and/or if the break contact 6 of the ignition starter switch unit is opened (that is, the ignition is switched on and the vehicle drive engine is therefore running).

This type of voltage supply of the electronic starter and steering locking device has the following advantages. In the ongoing driving mode, the two serially connected break contacts 6, 10 of the ignition starter switch unit 1 and the transmission shift lever 3 ensure that the servomotor 8 of the steering locking unit 2 remain without voltage, and the steering locking unit 2 is thus prevented from inadvertently assuming its locked state. When the vehicle is shut off and the transmission shift lever is in the parked position "P", the steering locking unit 2 can be placed in its locked state by means of a locking control unit 7.

When the vehicle is started, apart from the ignition starter control unit 4, the locking control unit 7 is also operationally capable, independently of the position of the break contacts 6, 10, and can therefore be interrogated by the ignition starter control unit 4 with respect to the locked state of the steering locking unit 2. The interrogation is carried out, as is the customary exchange of data between the two control units 4, 7, via an associated data line 14. If the interrogation is successful (i.e., the locking control unit 7 signals that the steering locking unit 2 is in the unlocked state), the ignition starter control unit 4 enables the starting of the vehicle drive engine.

Because such interrogation communication between the two control units 4, 7 is possible regardless of the position in which the transmission shift lever is located, the drive engine can be started not only in the parked position "P" but also in the neutral position "N" of the transmission shift lever. On the other hand, the interruption of the voltage supply for the locking servomotor 8 by the break contact 10 of the transmission shift lever unit 3 prevents the servomotor 8 from inadvertently placing the associated actuator element (and thus the steering locking unit 2 in its entirety) in the locked state in the ongoing driving mode of the vehicle.

The foregoing disclosure has been set forth merely to illustrate the invention and is not intended to be limiting. Since modification of the disclosed embodiments incorporating the spirit and substance of the invention may occur to persons skilled in the art, the invention should be construed to include everything within the scope of the appended claims and equivalents thereof.

What is claimed is:

1. An electronic starter and steering locking device for a motor vehicle, comprising:
    a steering locking unit having a locking control unit that operates a locking actuating unit for locking and unlocking a vehicle steering element;
    a vehicle starter unit for starting and stopping operation of the motor vehicle; and
    a voltage supply; wherein
    the locking control unit is continuously connected to the voltage supply, independently of a driving state of the vehicle;
    the locking actuating unit is connected to the voltage supply via interrupter switching means, which can be switched as a function of an operating state of the vehicle starter unit, as a function of a switched position of a drive train transmission shift lever; and
    the interrupter switching means includes an ignition switching element of which is contained in the vehicle starter unit and switches as a function of said operating state of the vehicle starter unit, and a further switching element which is connected in series with the ignition switching element and switches as a function of the position of said drive train transmission shift lever.

2. The electronic starter and steering locking device according to claim 1, wherein the vehicle starter unit includes a vehicle starter control unit which has a data communications connection to the locking control unit.

3. A method of operating vehicle electronic starter and steering apparatus having a steering locking unit which includes a locking control unit that operates a locking actuating unit for locking and unlocking a vehicle steering element, and a vehicle starter unit for starting and stopping operation of the motor vehicle; said method comprising:
    continuously supplying an operating voltage to said locking control unit, independently of a driving state of the vehicle; and
    supplying an operating voltage to said locking actuating unit via a series connection of first and second switching elements, said first switching element being included in a vehicle starter unit of the electronic starter, and said second switching element being associated with a transmission shift lever of said vehicle; wherein,
    said first switching element is switched between open and closed states as a function of an operating state of said starter unit; and
    said second switching element is switched between open and closed states as a function of a position of said transmission shift lever.

4. In a motor vehicle having a vehicle starter unit for starting and stopping operation of a vehicle engine, and a steering locking device that includes a steering locking control unit that controls operation of a steering locking actuating unit for locking and unlocking a vehicle steering element; apparatus for energizing said steering locking control unit and said steering locking actuating unit, said apparatus comprising:
    first means for continuously supplying an operating voltage to said steering locking control unit, independently of a driving state of the vehicle; and
    second means for interruptibly supplying an operating voltage to said steering locking actuating unit, as a function of an operating state of said vehicle starter unit, and as a function of a position of a transmission shift lever of said vehicle; wherein;
    said second means comprises a series connection of an ignition switching element which is contained in the vehicle starter unit and switches between open and closed states as a function of said operating state of the vehicle starter unit, and a further switching element that is associated with said transmission shift lever and switches between open and closed states as a function of said position of said shift lever.

* * * * *